United States Patent [19]
Bischoff, Jr.

[11] 3,974,252

[45] Aug. 10, 1976

[54] PROCESS OF FORMING MOLDABLE POLYMERS

[76] Inventor: Robert F. Bischoff, Jr., 30 Fairmount Ave., Morristown, N.J. 07960

[22] Filed: July 5, 1974

[21] Appl. No.: 444,799

[52] U.S. Cl. .................................. 264/299; 264/327
[51] Int. Cl.² ........................................ B29C 5/00
[58] Field of Search ............... 264/237, 327, 342 R, 264/230, 299

[56] References Cited
UNITED STATES PATENTS

| | | | |
|---|---|---|---|
| 3,262,451 | 7/1966 | Morse | 264/342 R |
| 3,577,484 | 5/1971 | Jacobson | 264/327 |
| 3,789,102 | 1/1974 | Hazelett, Jr. | 264/295 |

FOREIGN PATENTS OR APPLICATIONS

| | | | |
|---|---|---|---|
| 640,357 | 4/1962 | Canada | 264/230 |

*Primary Examiner*—Robert F. White
*Assistant Examiner*—T. E. Balhoff

[57] ABSTRACT

A method or process of forming an arch or curve or other geometric figure or a memory retention of said arch, curve, or other geometric figure, in either extruded moldable polymer or moldable polymer, either filled or unfilled.

2 Claims, No Drawings

PROCESS OF FORMING MOLDABLE POLYMERS

It is known to those familiar with the art of molding polymer, that in order to obtain a plane on the polymer being molded, said polymer must be heated evenly, so that all portions of said polymer cool evenly at the same time. It is obvious that in order to obtain this desired simultaneous cooling of all portions of the moldable polymer, said portions must not only be heated evenly, but all portions of the said polymer must be of the same thickness.

This process is an improvement to the present said method of molding polymer, whereby if a portion or portions of the moldable polymer cool(s) slower than the other portion(s), a curving or arching effect will result on the slower cooling portion(s), upon the release from the mold(s) since the said cooled portion(s) will be set into position, having contracted in the cooling process into this said set Position. A curving or arching of the uncooled or expanded molten or semi-molten portion(s) will subsequently result because the uncooled portion(s) will still be in a heated and expanded condition, and the cooled contracted portion(s) will exert pressure upon the said expanded molten or semi-molten portion(s) causing the said uncooled molten or semi-molten portion(s) to form an arch, curve, or other geometric figure with relation to the already cooled shape.

The degree of arching or curving of a portion or of portions of the moldable polymer is dependent upon a number of variables, such as, the pressure exerted upon the polymer, the heating of the polymer being extruded, and other factors governing the extruding and molding processes currently used. The degree of arching or curving is also dependent upon the variation of time in the cooling of the portion(s) of the said polymer as well as the point at which the cooling takes place; that is, if the expanded uncooled portion(s) of polymer have started cooling by the time the cooled portion(s) have completely cooled and contracted, the curve or arch will not be of the same degree as the arch or curve resulting if the uncooled expanded portion is still molten or semi-molten and heated at the time the cooled portion(s) have contracted and set into position or if the said polymer is cooled in the mold(s) under certain conditions, this said arching or curving will not take place until the polymer is reheated. Therefore, the degree of arching or curving is proportionate to the degree of cooling.

This new method of molding polymers to obtain and arch or curve, involves the cooling process itself, or the thickness of the polymer being molded, or a combination of both the said cooling process and the thickness of the moldable polymer, its being understood that the cooling process can depend upon and can result from the heating process.

Regarding the cooling process, and using the theory of arching or curving moldable polymer explained above, if the degree of arching desired is great, after heating the said polymer to a liquefied state, and casting said polymer in a mold(s), upon release from the mold(s), a drastic cooling of all portions of the said polymer, except the portion(s) to be arched is effected by the following method. The portion(s) of the moldable polymer which are not to be arched or curved are placed into a coolant to be drastically cooled. Such a cooling agent may be a cold water bath or bursts of cold air, though other methods of drastic cooling may be used and are considered within the scope of this patent. The portion(s) to be cooled and contracted, and the portion(s) to be arched or curved through a slower cooling process or through natural cooling, are dependent upon the desired effect to be attained, and it is obvious that many variations may be achieved limited only by the ingenuity of the technician molding the polymer.

One variation to the said cooling process may be used to obtain an arch or curve, and said variation is also included in this patent. Using this said technique, a portion of the moldable polymer is purposely cast in the die or mold with a greater degree of thickness than the other portion(s). Said thicker portion(s) will, consequently, because of said additional thickness, cool more slowly than the other portion(s). The result will be an arching or curving of said thicker portion(s), which said arching or curving will be of a degree determined by the variation of additional thickness used for the said portion(s) as compared with the thickness of the other portion(s) of the moldable polymer.

In addition, using the technique of a greater thickness on a portion(s) of the polymer being molded, the said polymer may be cooled naturally as described, or a portion(s) may be drastically cooled as described herein, and any combination(s) of these said methods is(are) considered within the scope of this patent.

It is understood that differences in polymers also exist and these differences are included in the scope of this patent. One such difference is filled polymer; that is, polymer mixed with additives such as silicon, steel, glass, quartz, chopped fiberglass, and similar materials. Said filled polymer has a different heat resistance which is advantageous in many cases, to the arching or curving method described, since said filled polymer will usually tend to arch or curve easier than unfilled polymer. Said filled polymer is also basically cheaper than unfilled polymer. Another example of a difference in polymer is laminated polymer or material laminated with polymer, which said material or polymer develops its own characteristics, said characteristics involving certain adaptations of this arching or curving method.

Although but a single embodiment of our invention has been illustrated and described, it is apparent to those skilled in the art, that in addition to the differences noted here, various changes and modifications may be made therein without departing from the spirit of the method or process or from the scope of the appended claims.

We claim:

1. A method of forming an arch, curve, or other geometric figure in filled or unfilled polymer, without clamping the peripheral portion of said moldable polymer, by:
   a. heating the moldable filled or unfilled polymer until it is in a moldable liquefied state;
   b. providing an open mold and allowing the liquefied polymer to conform to the shape of the mold;
   c. cooling spaced apart portions of the said heated polymer so that said cooled portions contract and set;
   d. retaining the uncooled portions in a heated molten or semi-molten state;
   e. having the cooled portions exert pressure during contraction and setting upon the uncooled molten or semi-molten portions which are intermediate the spaced apart cooled portions;
   f. having said exertion of pressure of said cooled portions upon said intermediate uncooled portions cause the said intermediate uncooled molten or semi-molten portions to form an arch, curve, or other geometric figure with relation to the said already cooled portions.

2. A method of forming an arch, curve, or other geometric figure in filled or unfilled polymer by:
a. heating the moldable filled or unfilled polymer until said polymer is in a moldable liquefied state;
b. providing an open mold having graduated or variable dimensions;
c. pouring the heated polymer into said open mold such that the polymer assumes spaced apart thinner portions and portions of greater thicknesses intermediate said thinner portions as a result of the graduated or variable dimensions of the mold;
d. uniformly cooling all surface portions of the polymer so that the thinner portions will cool faster than the portions of said polymer cast with greater thicknesses, said faster cooling of the thinner portions causing them to set and contract, thereby exerting pressure upon the thicker semi-heated or heated portions of the polymer which are intermediate said spaced apart thinner portions, said pressure causing the said thicker portions to arch, curve, or form other geometric figures.

* * * * *